United States Patent
Nakase et al.

(10) Patent No.: US 7,007,345 B2
(45) Date of Patent: Mar. 7, 2006

(54) OPENING AND CLOSING DEVICE

(75) Inventors: Masaki Nakase, Fukui (JP); Yasuchika Kudo, Fukui (JP); Koji Sakai, Fukui (JP); Hidenobu Sakai, Osaka (JP); Kiyokazu Yabukami, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 80 days.

(21) Appl. No.: 10/681,533

(22) Filed: Oct. 7, 2003

(65) Prior Publication Data

US 2004/0131421 A1    Jul. 8, 2004

(30) Foreign Application Priority Data

Oct. 31, 2002  (JP)  .............................. 2002-318195

(51) Int. Cl.
*E05F 1/10*        (2006.01)

(52) U.S. Cl. ............................ 16/330; 16/326; 16/327; 16/328; 379/433; 379/433.13

(58) Field of Classification Search .................. 16/330, 16/321, 325, 327, 328, 326; 379/433.13, 379/433.01, 433.05; 361/680–683
See application file for complete search history.

(56) References Cited

U.S. PATENT DOCUMENTS

| | | | | |
|---|---|---|---|---|
| 5,398,378 A | * | 3/1995 | Lin | 16/303 |
| 5,923,751 A | * | 7/1999 | Ohtsuka et al. | 379/433.13 |
| 5,987,122 A | * | 11/1999 | Daffara et al. | 379/433.13 |
| 5,996,179 A | * | 12/1999 | Huong | 16/330 |
| 6,070,298 A | * | 6/2000 | Sorimachi | 16/330 |
| 6,148,480 A | * | 11/2000 | Cooke | 16/303 |
| 6,459,887 B1 | * | 10/2002 | Okuda | 455/90.1 |
| 6,530,121 B1 | * | 3/2003 | Hayashi | 16/330 |
| 6,658,699 B1 | * | 12/2003 | Huong | 16/330 |
| 6,678,539 B1 | * | 1/2004 | Lu | 455/575.1 |
| 6,766,180 B1 | * | 7/2004 | Doraiswamy et al. | 455/575.1 |
| 6,829,807 B1 | * | 12/2004 | Kim | 16/322 |
| 6,886,221 B1 | * | 5/2005 | Minami et al. | 16/324 |
| 2004/0052058 A1 | * | 3/2004 | Minami et al. | 361/724 |
| 2004/0245342 A1 | * | 12/2004 | Cho et al. | 235/472.01 |

* cited by examiner

*Primary Examiner*—Brian E. Glessner
*Assistant Examiner*—Mark Williams
(74) *Attorney, Agent, or Firm*—RatnerPrestia (57) ABSTRACT

An opening and closing device includes a rotor pressed by a rotor spring and a reverse-rotor pressed by reverse-rotor spring, of which rotor cam and reverse-rotor cam are respectively placed at a certain position of stator cam. With this construction, rotor is urged in an opening direction in the opening condition and urged in a closing direction in the closing condition with respect to stator. A release cam pushes the reverse-rotor cam by moving a releaser along an axis, so that the device opens.

12 Claims, 6 Drawing Sheets

OPENING AND CLOSING DEVICE

FIELD OF THE INVENTION

This invention relates to an opening and closing device for use in a portable telephone, a small personal computer, and other various electronic instruments.

BACKGROUND OF THE INVENTION

Portable telephones, small personal computers and other electronic instruments have been recently compacted, light-weighted, and are given higher convenience, and an instrument having an openable and closable housing relative to a base housing, so called foldable type, is increasing. With this trend, an opening and closing device of easy open/close operation is required.

A conventional opening and closing device is described with reference to FIGS. 4, 5 and 6.

Figure 5:
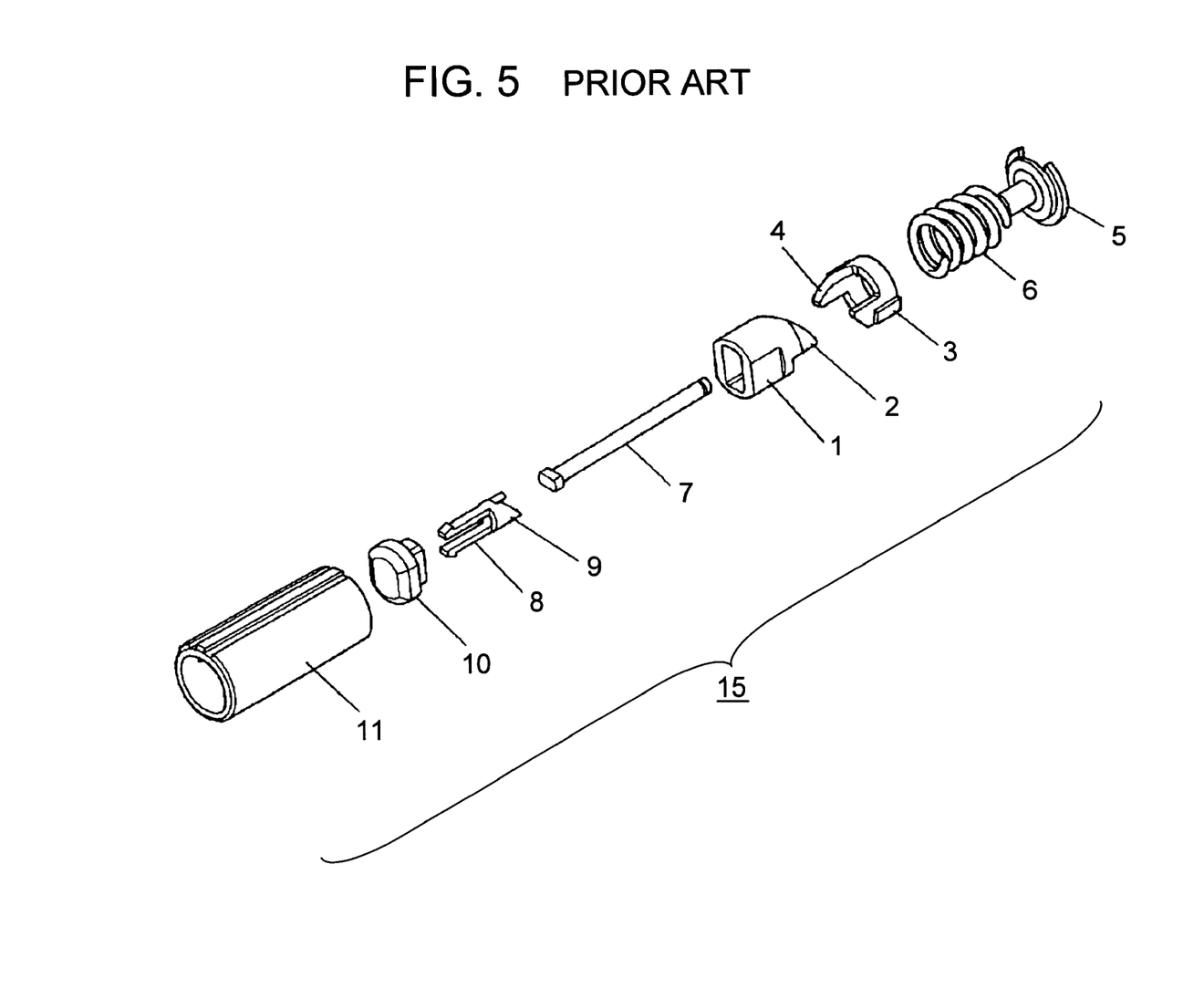
FIG. 5 is an exploded perspective view of a conventional opening and closing device.

As shown in FIG. 5, the conventional opening and closing device 15 includes stator 1 in substantially tubular shape having a hollow portion in its center, rotor 3 in substantially tubular shape, fix cover 5 in substantially disk shape, rotor spring 6 in substantially coil shape, fix shaft 7 in substantially cylindrical shape, releaser 8 disposed slidably along an axis, push-button 10, and rotary case 11 in substantially tubular shape. Stator 1 has a pair of stator cams 2 at an outer periphery of its right side face, rotor 3 has a pair of rotor cams 4 at an outer periphery of its left side face, and releaser 8 has a pair of release cams 9 at its right side face.

Figure 6A:
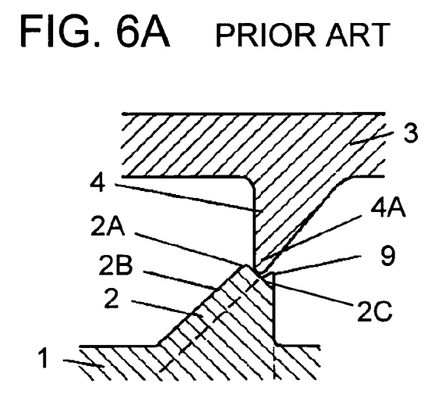
FIGS. 6A, 6B, 6C and 6D are cross-sectional views of a main portion of the conventional opening and closing device.

As illustrated in FIG. 6A, stator cam 2 has tip portion 2A and two inclined portions 2B and 2C each extending from tip portion 2A toward left and right.

Rotor 3 is disposed rotatably with respect to stator 1 for opening and closing. Rotor spring 6, which is interposed between rotor 3 and fix cover 5 in a little compressed manner, pushes rotor 3 toward stator 1, so that rotor cam 4 is pressed to inclined portion 2C of stator 1.

Fix shaft 7 is attached to stator 1 at its left end portion, and its right end portion is attached to fix cover 5 inserted through a hollow portion of rotor 3 and rotor spring 6.

Releaser 8 passes through the hollow portion of stator 1, and push-button 10 comes out of the left end of rotary case 11.

Inside rotary case 11, fix shaft 7 and stator 1 are rotatably accommodated, releaser 8 and rotor 3 are slidably accommodated in parallel along the axis, and fix shaft 7, stator 1, releaser 8 and rotor 3 are accommodated along substantially the same axis. Fix cover 5 is rotatably attached to a right end portion of rotary case 11, so that opening and closing device 15 is constituted.

Figure 4:
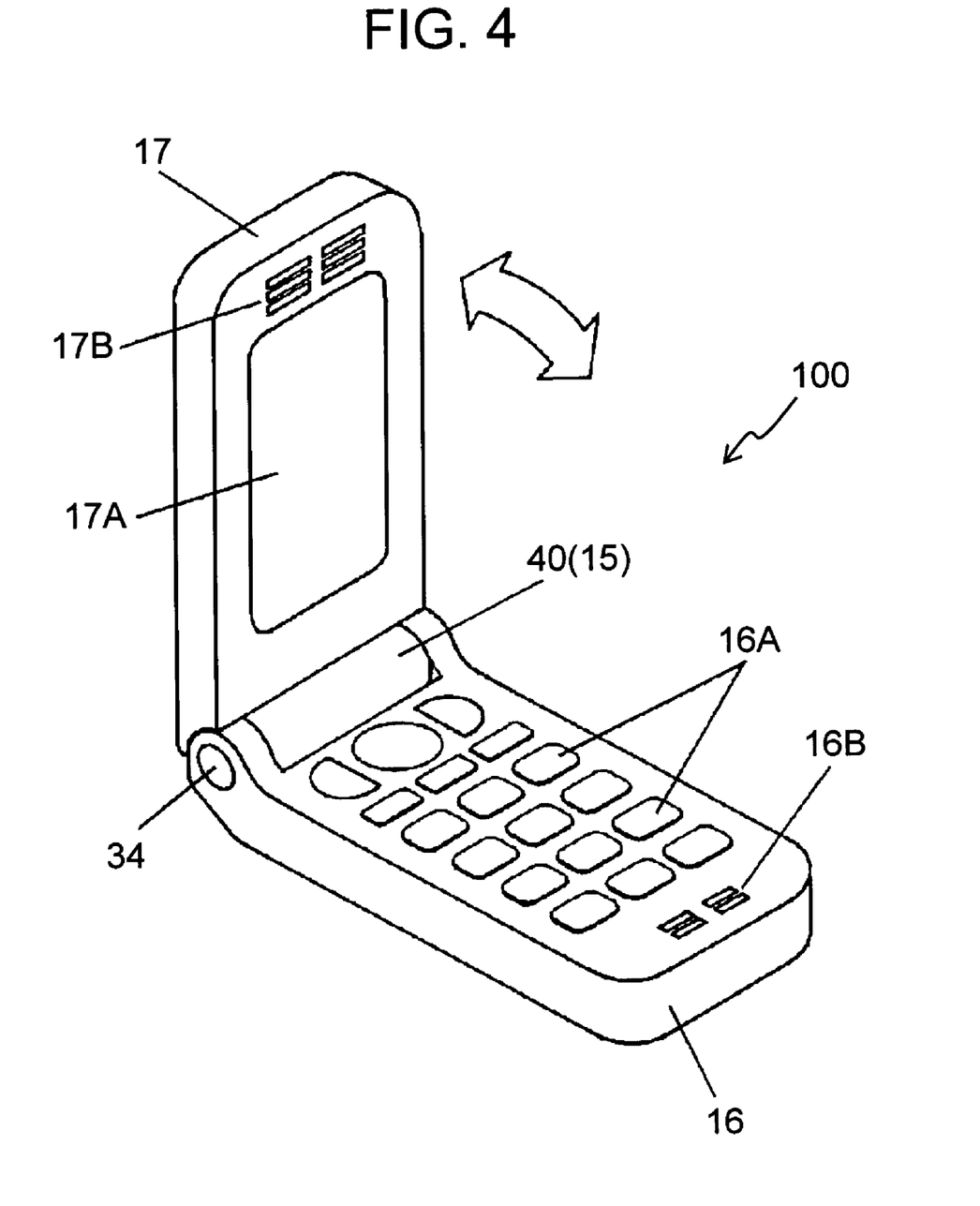
FIG. 4 is a perspective view of an electronic device.

FIG. 4 shows an example of opening and closing device 15 as applied to portable telephone 100. Telephone 100 includes base housing 16, foldable housing 17, and opening and closing device 15. Fix cover 5 is attached to base housing 16, and rotary case 11 is fixed to foldable housing 17. Device 15 allows foldable housing 17 to open and close with respect to base housing 16. Base housing 16 has operating portion 16A and includes a plurality of keys and voice input portion 16B such as a microphone on its upper surface. Foldable housing 17 has display portion 17A such as a LCD and other voice output portion 17B such as a speaker on its surface.

Next, a working mechanism of conventional opening and closing device 15 is described with reference to FIGS. 6A to 6D schematically showing positional relation between stator cam 2, rotor cam 4 and release cam 9 before, during, and after their motions.

FIG. 6A shows a state where tip portion 4A of rotor cam 4 contacts inclined portion 2C at right side of stator cam 2. At this time, rotor 3 which is pressed downward by rotor spring 6 is urged toward a closing direction, i.e., in a right direction in the drawing, whereby foldable housing 17 attached to rotary case 11 is retained in a closed condition to base housing 16.

When foldable housing is manually opened from the closed condition, rotary case 11 attached to foldable housing 17 rotates leftward, and rotor 3 rotates together leftward. With this rotation, tip portion 4A of rotor cam 4 crosses over tip portion 2A of stator cam 2 and moves to a left side of inclined portion 2B. Consequently, rotor 3 is pushed toward an opening direction, i.e., in a left direction in FIG. 6A, and foldable housing 17 retains the opening condition.

Figure 6B:
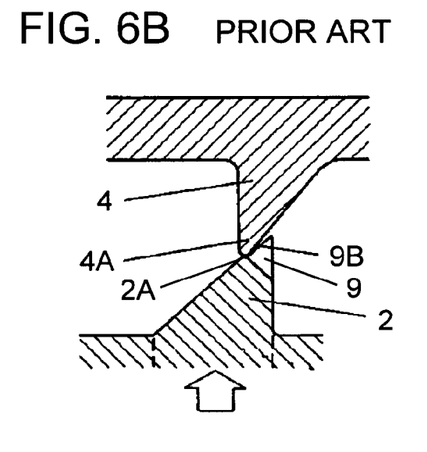
Figure 6C:
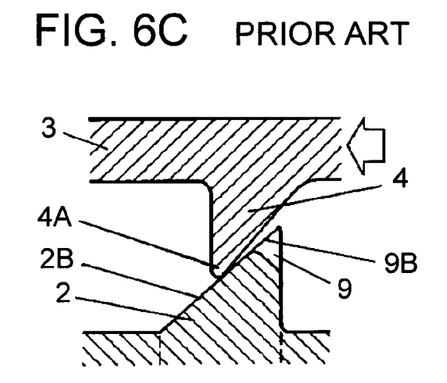
Figure 6D:
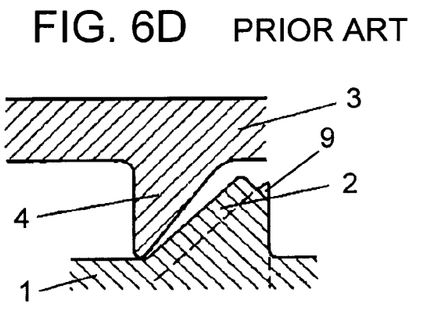

FIG. 6B explains working mechanism of a case where push-button 10 protruded at a left end portion is pressed, when foldable housing 17 is closed. Releaser 8 pushed by button 10 moves toward rotor cam 4 in an upper part in the drawing. Release cam 9 formed at an end portion of releaser 8 pushes up tip portion 4A of rotor cam 4 which has been resiliently urged by rotor spring 6. Rotor cam 4 is pushed upward (in an arrow direction in FIG. 6B), while rotor spring 6 is compressed further. Immediately after tip portion 4A is moved to inclined portion 9B at the left side of release cam 9, rotor 3 is urged to rotate toward the opening direction in the left direction. After that, as shown in FIG. 6C, tip portion 4A is shifted from inclined portion 9B of release cam 9 to inclined portion 2B of stator cam 2, and rotor 3 is further urged to rotate toward left in the opening direction. Finally foldable housing 17 becomes an open condition as is shown in FIG. 6D.

As described above, there are two ways to open foldable housing 17. One way is to open housing 17 manually, and the other way is to push button 10 by a single touch.

On the contrary, when foldable housing 17 is closed, housing 17 is manually rotated in the closing direction, i.e., in a right direction in FIG. 4. With this rotation, rotor 3 rotates rightward, and tip portion 4A moves to inclined portion 2C of stator cam 2.

As described above, with the conventional opening and closing device, when push-button 10 is pressed to open foldable housing 17 with one touch, release cam 9 pushes rotor cam 4 upwards, while contracting rotor spring 6. Rotor spring 6 resiliently urges rotor cam 4, in the closing direction in the closing condition, or in the opening direction in the opening condition, thereby giving push force in either direction. Therefore, when the load of rotor spring 6 is decreased, the push force of a spring is reduced in both the opening and closing direction, thereby making the device difficult to be retained in an either opening or closing condition. For this reason, in a conventional opening and closing device, it is hard to realize a light push operation for easy handling.

SUMMARY OF THE INVENTION

An opening and closing device includes a rotor urged by a rotor spring and a reverse-rotor urged by a reverse-rotor spring, and a cam of the rotor and a cam of the reverse-rotor set to a predetermined position of a cam of the stator. With this arrangement, the rotor is urged in an opening direction in a closing condition, and is urged in a closing direction in a closing condition with respect to the stator. In the closing condition, a release cam presses the reverse cam by moving a releaser along an axis, so that a direction, where the rotor is urged, is changed from the closing direction to the opening direction. Because the rotor cam and the reverse-rotor cam are respectively pressed to the stator cam by the rotor spring and the reverse-rotor spring, even when the load of each spring for urging is small, the opening condition and the closing condition are stably retained. In addition, when the device is opened with one touch, the release cam pushes only the reverse-rotor cam, which enables the opening and closing device to be operated with the light push.

DESCRIPTION OF THE INVENTION

An exemplary embodiment of this invention is described hereinafter with reference to FIGS. 1 to 4.

(Exemplary Embodiment)

Figure 1:
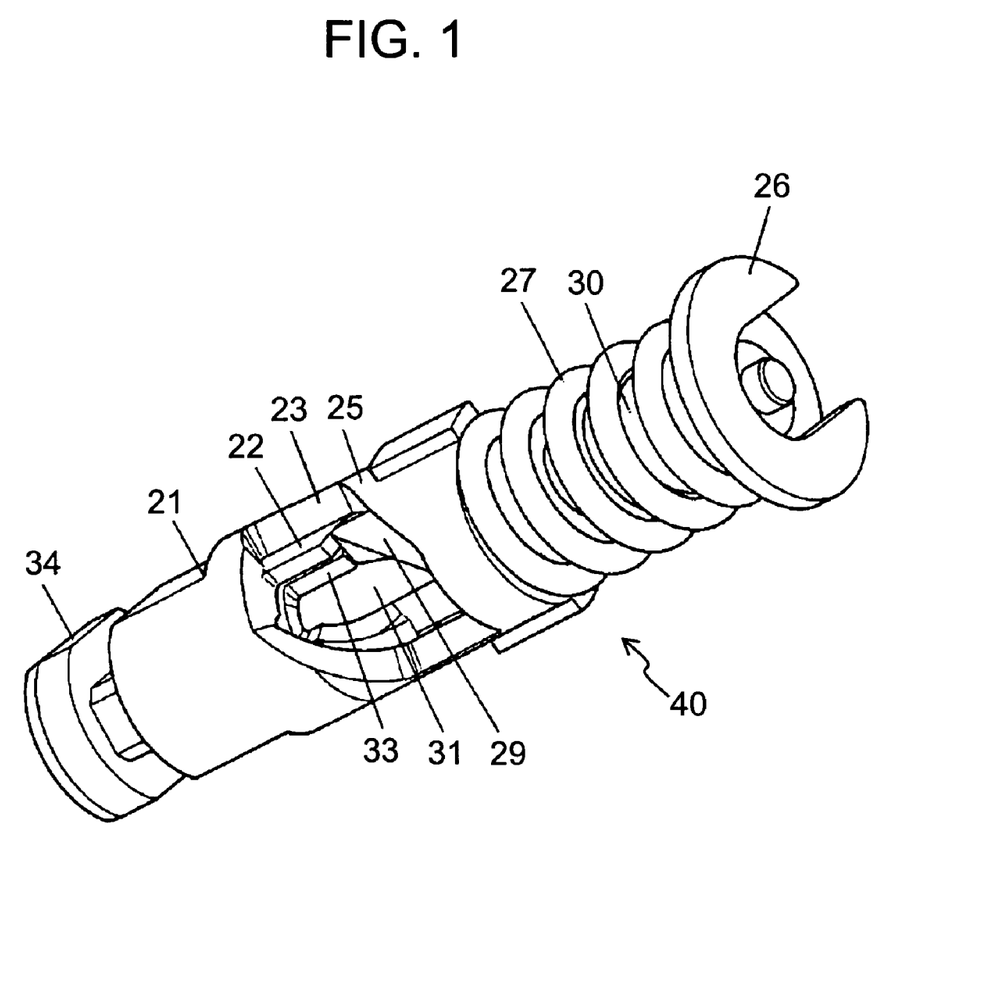
FIG. 1 is a cross-sectional and perspective view of a main portion of an opening and closing device in accordance with the exemplary embodiment of the present invention
Figure 2:
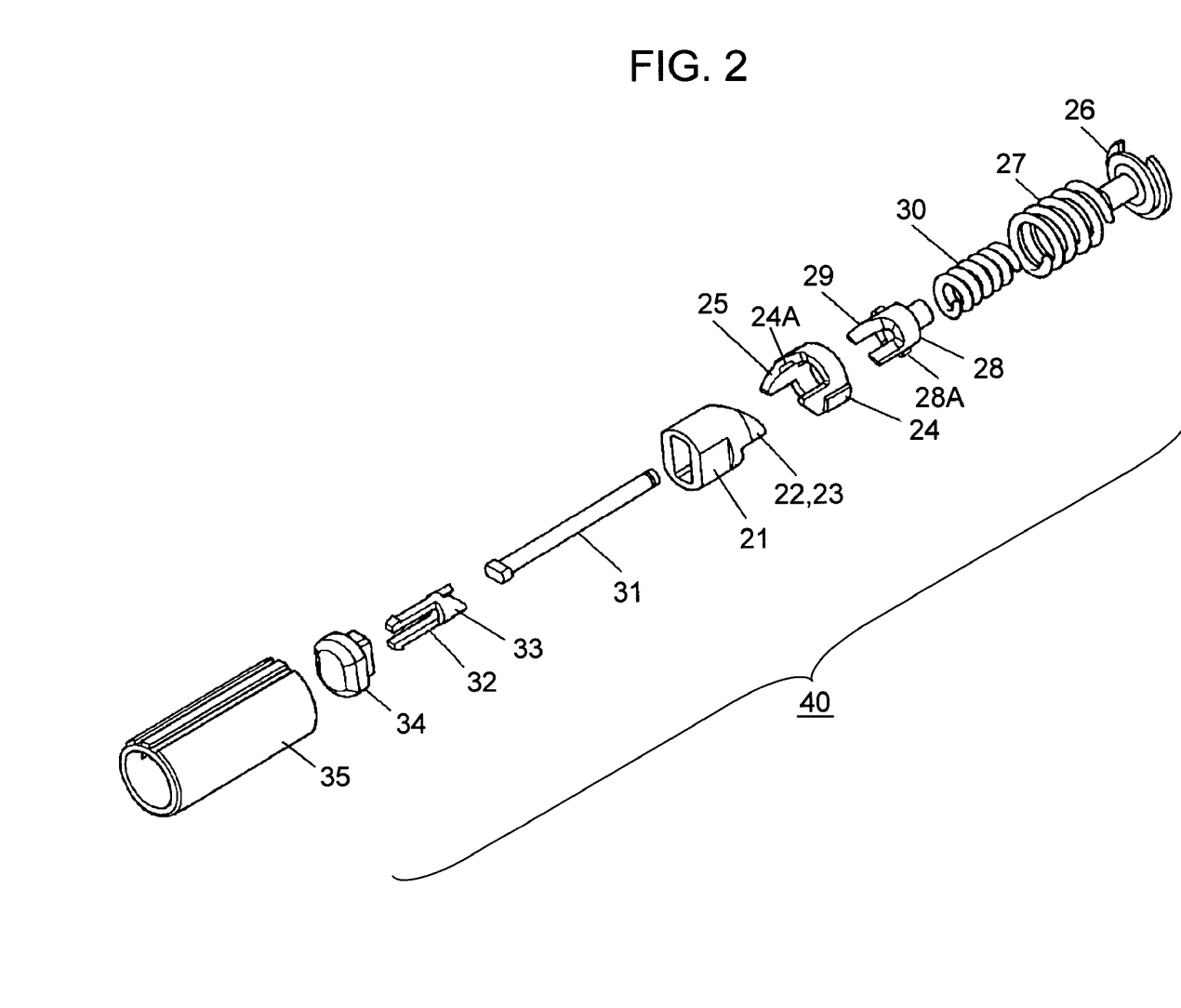
FIG. 2 is an exploded perspective view of the opening and closing device in accordance with the exemplary embodiment of the present invention.

An opening and closing device in this exemplary embodiment includes stator 21 in substantially tubular shape, made of metal and having a hollow portion in its center, rotor 24 in substantially tubular shape and made of metal, fix cover 26 in substantially disk shape and made of metal or of insulating resin, rotor spring 27 in coil shape and made of a metal wire, reverse-rotor 28 made of metal, reverse-rotor spring 30 in coil shape and made of a metal wire, fix shaft 31 in substantially cylindrical shape, releaser 32, push-button 34, and rotary case 35 in substantially tubular shape and made of metal or of insulating resin.

Stator 21 has two types of stator cams (i.e., a pair of first stator cams 22 having steeply inclined portion 22A, and a pair of second stator cam 23 having moderately inclined portion 23A) along an outer periphery of its right side face. Second stator cam 23 has a steeply inclined second inclined portion at its base portion and the moderately inclined first inclined portion at its upper portion. Rotor 24 has a pair of rotor cams 25 at an outer periphery of its left side face. Reverse-rotor 28 has a pair of reverse-rotor cams 29 at an outer periphery at its left side face. Releaser 32 has a pair of release cams 33 at an outer periphery of its right side face. Each pair of the cams is formed substantially axial symmetrically. Working mechanism of the opening and closing device in the exemplary embodiment is described hereinafter referring to one of the cams in one of the pairs interrelating with another of the cams in another of the pairs, using the drawing.

Rotor 24 is disposed rotatably with respect to stator 21. Rotor 24 is urged by rotor spring 27 interposed between fix cover 26 and rotor 24 in a manner to be contracted, therefore tip portion 25A of rotor cam 25 is pushed to first inclined portion 23A of a left side of second stator cam 23.

Reverse-rotor 28 is disposed rotatably with respect to stator 21, and also disposed rotatably at a certain angle with respect to rotor 24. Reverse-rotor 28 is pushed to rotor 24 by reverse-rotor spring 30 which is interposed between fix cover 26 and reverse-rotor 28 in a manner to be contracted, thereby tip portion 29A of reverse-rotor cam 29 is pressed to steeply inclined portion 22A at a right side of first stator cam 22.

Reverse-rotor 28 has protrusion 28A on its outside periphery, and rotor 24 has groove 24A on its inside periphery where protrusion 28A slides and engages one part of groove 24A.

Reverse-rotor spring 30, which is placed inside rotor spring 27, has an outer diameter slightly smaller than an inner diameter of rotor spring 27, and comes into contact with reverse-rotor 28 inside rotor 24 and fix cover 26.

Fix shaft 31 is attached to stator 21 at its left end portion, and to fix-cover 26 at its right end portion, where a hollow portion of rotor 24, rotor spring 27, and reverse-rotor spring 30 are inserted therebetween.

Releaser 32 is inserted slidably and axially through the hollow portion of stator 21.

Push-button 34 protrudes from a left end portion of rotary case 35. Inside rotary case 35, fix shaft 31 and stator 21 are rotatable, releaser 32, rotor 24 and reverse-rotor 28 are axially slidable, and fix shaft 31, stator 21, releaser 32, rotor 24 and reverse-rotor 28 are aligned along substantially the same axis. Fix-cover 26 is rotatably fixed at a right end of rotary case 35.

FIG. 4 illustrates an example of opening and closing device 40 structured discussed above and applied to portable telephone 100. Telephone 100 includes base housing 16, foldable housing 17 and opening and closing device 40. Fix cover 26 is fixed to base housing 16, and rotary case 35 is fixed to foldable housing 17. Foldable housing 17 is openably and closably journaled at device 40 with respect to base housing 16. Push-button 34 is attached at an end face of the device 40. Base housing 16 includes operating portion 16A having a plurality of keys, and voice input portion 16B such as a microphone on its upper surface. Foldable housing 17 includes display portion 17A such as a LCD, and voice output portion 17B such as a speaker, on its face.

Next, an opening and closing mechanism of the device in the exemplary embodiment of this invention and an electronic instrument using the device are described with reference to cross-sectional views of main portion of FIGS. 3A to 3D. FIGS. 3A to 3D schematically illustrate positional relation between first stator cam 22, second stator cam 23, rotor cam 25, reverse-rotor cam 29 and release cam 33, before, during and after their motion. Although first stator cam 22, second stator cam 23, rotor cam 25, reverse-rotor cam 29 and release cam 33 are three-dimensionally formed around an outer periphery of substantially cylindrical or of substantially tubular component, developed plan views are provided to demonstrate motion of components in an easy manner.

Figure 3A:
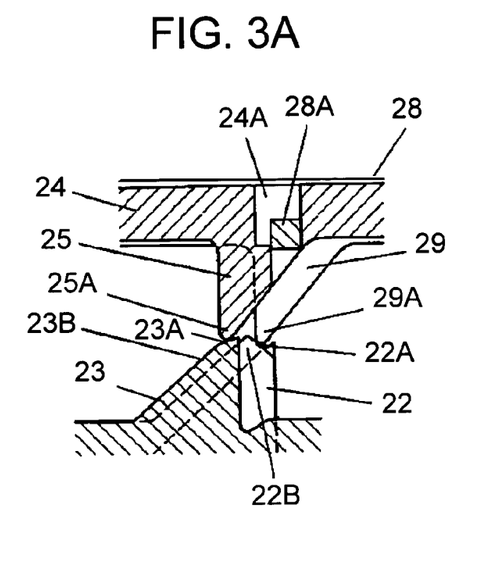
FIGS. 3A, 3B, 3C and 3D are cross-sectional views of the main portion of the opening and closing device in motion, in accordance with the exemplary embodiment of the present invention.

FIG. 3A shows the device is in a closed condition, in which the face of foldable housing 17 touches the upper surface of base housing 16. Because rotor 24 is pushed by rotor spring 27, tip portion 25A of rotor cam 25 is pressed to the moderately inclined first inclined portion 23A at the left side portion of second stator cam 23. At the same time, because reverse-rotor 28 is pushed by reverse-rotor spring 30, tip portion 29A of reverse-rotor cam 29 is pressed to steeply inclined portion 22A at the right side of first stator cam 22.

At this time, rotor 24 is urged leftward (namely, in an opening direction) and reverse-rotor 28 is urged rightward (namely, in a closing direction) in FIG. 3A. In a word, each rotor is urged toward an opposite direction. The slope of first inclined portion 23A of stator cam 23 which is pressed by rotor cam 25 is moderate, and the slope of inclined portion 22A of first stator cam 22 pressed by reverse-rotor cam 29 is steep. Protrusion 28A formed on an outside periphery of reverse-rotor 28 comes into contact with a wall of groove 24A formed on inner periphery of rotor 24, and prevent rotor 24 and reverse-rotor 28 from moving in a different separated direction. Thus foldable housing 17 attached to rotary case 35 is retained in a closed condition relative to base housing 16.

When foldable housing 17 is manually opened from the closed condition, rotor 24 rotates leftward together with rotation of case 35 attached to foldable housing 17, and reverse-rotor 28 rotates leftward by protrusion 28A which comes into contact with the wall of groove 24A.

With this motion, tip portion 25A pressed to first inclined portion 23A of second stator cam 23 moves leftward. At the same timing, tip portion 29A of reverse-rotor cam 29 moves leftward crossing over tip portion 22B of first stator cam 22. Because both rotor 24 and reverse-rotor 28 are moved leftward, i.e., in the opening direction, foldable housing 17 becomes an open condition.

Figure 3B:
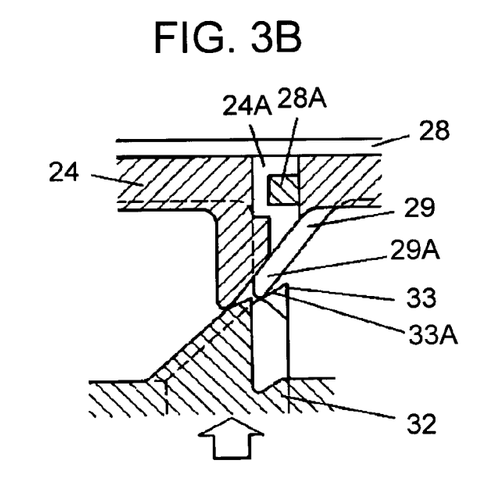
Figure 3C:
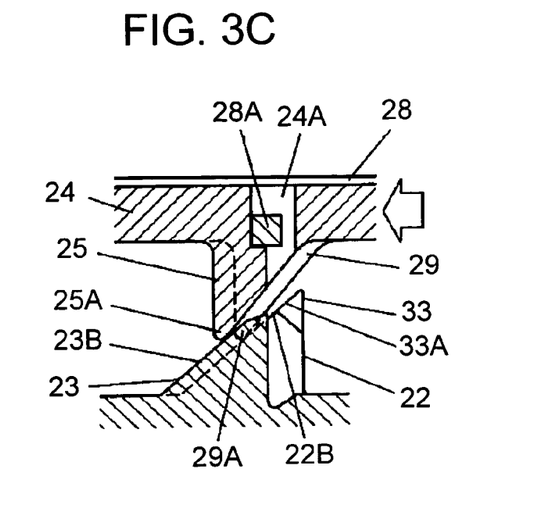
Figure 3D:
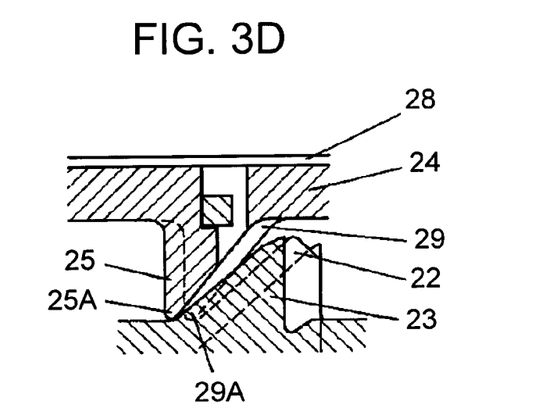

In this condition, as shown in FIG. 3D, tip portion 25A of rotor cam 25 and tip portion 29A of reverse-rotor cam 29 are contacted to stator cams 23 and 22 respectively, and move in the opening direction. As a result, the opening condition of the device is securely maintained even when the load of rotor spring 27 or of reverse-rotor spring 30 is small.

When foldable housing 17 is closed, on the contrary, foldable housing 17 is manually rotated rightward i.e., in the closing direction. Rotor 24 and reverse-rotor 28 are together rotated rightward, and rotor cam 25 is pressed to first inclined portion 23A of second stator cam 23, and reverse-rotor cam 29 is pressed to inclined portion 22A of first stator cam 22. Foldable housing 17 is thus opened and closed.

Next, a mechanism for opening foldable housing 17 from the closed condition by pushing push-button 34 in a one-touch manner is described hereinafter.

In the closed condition of foldable housing 17 as shown in FIG. 3A, when push-button 34 is pressed, releaser 32 pressed by push-button 34 moves toward reverse-rotor 28 i.e., in an upper direction as shown by arrow in FIG. 3B. With this motion, release cam 33 pushes tip portion 29A of reverse-rotor cam 29 upward which is resiliently urged by reverse-rotor spring 30. Release cam 33 continues pushing up reverse-rotor 28 while further contracting reverse-rotor spring 30.

At this time, as discussed above, the opening and closing conditions are securely maintained, even when the load of rotor spring 27 or of reverse-rotor spring 30 is small. Therefore, by setting the load of reverse-rotor spring 30 to be small, reverse-rotor 28 is pressed with a light push operation.

Then, pushed up tip portion 29A of reverse-rotor cam 29 is moved toward inclined portion 33A at a left side of release cam 33, so that reverse-rotor 28 is urged and rotated leftward in the opening direction. Tip portion 29A is then shifted from inclined portion 33A of release cam 33 to a left side of first tip portion 22B of first stator cam 22, as illustrated in FIG. 3C.

At this timing, rotor 24 rotates leftward, and tip portion 25A of rotor cam 25 moves while keeping press of second inclined portion 23B of second stator cam 23. Consequently, rotor 24 and reverse-rotor 28 are both urged leftward, i.e., in the opening direction, as shown in FIG. 3D, so that foldable housing 17 is now in the open condition.

Additionally, as illustrated in FIGS. 3B and 3C, when rotor 24 and reverse-rotor 28 are rotated from the closing condition to the opening condition, protrusion 28A, which has been engaged with the wall of groove 24A on the inner periphery of rotor 24, on the outer periphery of reverse-rotor 28, pushes the opposite wall of groove 24A. Then, reverse-rotor 28 pushes rotor 24, so that push force in the opening direction is strengthened and the opening condition is more stably retained.

As described, the opening and closing device in the exemplary embodiment of this invention includes reverse-rotor 28 resiliently pushed by reverse-rotor spring 30, in addition to rotor 24 resiliently pushed by rotor spring 27. The opening and closing conditions are retained by rotor cam 25 and reverse-rotor cam 29 set to a predetermined position of stator cam 23 and 22. Because of it, the opening and closing conditions is securely maintained even when the load of reverse-rotor spring 30 or rotor spring 27 is small. Moreover, when the device is opened by one-touch action, release cam 33 pushes only reverse-rotor cam 29, whereby the device with a light touch operation can be obtained.

Furthermore, a plurality of cams, i.e., first stator cam 22 and second stator cam 23 are formed on stator 21. Then rotor cam 25 is pressed to moderately inclined portion 23A of second stator cam 23, and reverse-rotor cam 29 is pressed to steeply inclined portion 22A of first stator cam 22. By balancing push force of two cams pushed, the closed condition is stably retained.

Still more, during the transition from the closing condition to the opening condition, reverse-rotor 28 comes into contact with rotor 24 by engaging protrusion 28A at outer periphery of reverse-rotor 28 with groove 24A at inner periphery of rotor 24. As a result, push force in the opening direction is strengthened and the opening condition is more securely retained.

As described above, the opening and closing device in this invention provides advantageous features, i.e., light touch push operation and stable retention of the opening and closing condition.

What is claimed is:

1. An opening and closing device comprising:
    a stator having a stator cam;
    a rotor having a rotor cam urged in an axial direction to be in contact with the stator cam by a rotor spring;
    a reverse-rotor having a reverse-rotor cam urged in the axial direction to be in contact with the stator cam by a reverse rotor spring, the reverse-rotor spring accommodated in an inner periphery of the rotor spring; and,
    a releaser having a release cam and being movable along an axis;
    so that when the releaser moves along the axis, the release-cam presses against the reverse-rotor cam of the reverse-rotor causing rotation of the reverse-rotor, to cause said device to open.

2. The opening and closing device as defined in claim 1, wherein the stator cam is one of a plurality of stator cams, and, when the device is closed, the rotor cam is pressing towards a first of said stator cams which is inclined and the reverse-rotor cam is pressing towards a second of said stator cams which is more inclined than said first of said stator cams.

3. The opening and closing device as defined in claim 1, wherein the reverse-rotor comes into contact with the rotor when the device is opened.

4. The opening and closing device as defined in claim 1, wherein, when the device is closed, the rotor is pressing towards a closing direction on the stator at a first position where the rotor cam and the reverse-rotor cam contact to the stator cam, and, when the device is closed, the rotor is pressing towards an opening direction reverse to the closing direction on the stator at a second position where the rotor cam and the reverse-rotor cam contact to the stator cam.

5. The opening and closing device as defined in claim 1, wherein, when the device is closed, the reverse-rotor is pushing the rotor toward a closing direction, and, when the device is opened, the reverse-rotor is pushing the rotor toward an opening direction.

6. The opening and closing device as defined in claim 1, wherein the reverse-rotor is rotatable to the rotor within a predetermined angle.

7. An opening and closing device comprising:
   a rotary case in substantially tubular shape;
   a fix cover covering an end of the rotary case;
   a stator, a rotor, and a rotor spring in coil shape inside the rotary case and aligned along substantially a same axis;
   a releaser accommodated in an inner periphery of the stator and the rotor;
   a fix shaft with an end thereof connected to the fix cover and another end thereof connected to the stator;
   a reverse-rotor accommodated in an inner periphery of the rotor; and
   a reverse-rotor spring, which is accommodated in an inner periphery of the rotor spring, for pushing the reverse rotor,
   wherein the stator has a first stator cam and a second stator cam facing the reverse rotor,
   wherein an inclined angle or a tip portion of the first stator cam is different from an inclined angle of a tip portion of the second stator cam.

8. The opening and closing device as defined in claim 7, wherein the tip portion of the first stator cam is inclined in an opposite direction to that of the second stator cam, and the inclined angle of the tip portion of the first stator cam is steeper than that of the second stator cam.

9. The opening and closing device as defined in claim 7, wherein the first stator cam is formed inside an inner periphery of the second stator cam.

10. The opening and closing device as defined in claim 7,
    wherein the rotor has a rotor cam at an end face thereof facing the stator cam, and the reverse-rotor has a reverse-rotor cam at an end face thereof facing the stator cam,
    wherein the rotor cam comes into contact with the second stator cam, and the reverse-rotor cam comes into contact with the first stator cam.

11. The opening and closing device as defined in claim 7,
    wherein the rotor has a groove portion on an inner periphery thereof and the reverse-rotor has a protrusion on an outer periphery thereof,
    wherein rotation of the reverse-rotor with respect to the rotor is restricted by engaging the protrusion with the groove portion.

12. The opening and closing device as defined in claim 7, wherein the rotor spring pushes the rotor cam toward the second stator cam, and the reverse-rotor spring pushes the reverse-rotor cam toward the first stator cam.

* * * * *